United States Patent [19]
Zavasnik

[11] 3,792,946
[45] Feb. 19, 1974

[54] MOLDING APPARATUS

[75] Inventor: Fred J. Zavasnik, Bolingbrook, Ill.

[73] Assignee: Continental Can Company, Inc., New York, N.Y.

[22] Filed: Dec. 16, 1971

[21] Appl. No.: 208,740

[52] U.S. Cl. 425/242, 425/DIG. 209, 425/DIG. 211, 425/387 B, 425/324 B
[51] Int. Cl. ............................................. B29d 23/03
[58] Field of Search ... 425/326, 387, 451, 249, 324, 425/DIG. 205, DIG. 209, DIG. 211, 387 B, 324 B

[56] References Cited
UNITED STATES PATENTS

| | | | |
|---|---|---|---|
| 3,632,267 | 1/1972 | Kader | 425/326 |
| 2,853,736 | 9/1958 | Gussoni | 425/324 |
| 3,100,913 | 8/1963 | DeMatteo | 425/324 X |
| 3,480,993 | 12/1969 | Schjeldahl et al. | 425/324 X |
| 3,482,284 | 12/1969 | Rees | 425/249 X |
| 3,609,803 | 10/1971 | Fattori | 425/326 X |

Primary Examiner—Richard B. Lazarus
Attorney, Agent, or Firm—Diller, Brown, Ramik & Wight

[57] ABSTRACT

Method and apparatus for molding plastic articles by forming a parison on a core within an injection mold, cooling the exposed surfaces of the parison by heat transfer through the core and the mold, transferring said core to a delay position and permitting the redistribution of heat throughout the parison, and subsequently transferring said core to a mold for expanding the parison to the desired configuration. The apparatus comprises two sets of cores, each actuated by rotating and reciprocating means whereby one set of cores is located at a delay station while a parison and the finished article are formed on the other set of cores, the multiple core sets permitting the maintenance of maximum production rates, and maximum orientation of the finished article.

10 Claims, 5 Drawing Figures

3,792,946

MOLDING APPARATUS

BACKGROUND OF THE INVENTION

This invention relates to the field of injection blow molding. More specifically, it relates to apparatus which may be utilized to manufacture hollow articles of thermoplastic material and is particularly adapted for use in conjunction with the injection blow mold process of my copending application, Ser. No. 201,823 filed Nov. 24, 1971 and assigned to the same assignee as the instant invention. This process is intended to maximize the degree of orientation of the molecular chains of a plastic material so as to obtain hollow articles having high strength and resistance to deformation under higher temperatures and pressures. The process obtains such orientation by injecting a thermoplastic material into a mold about a core and rapidly cooling those surfaces exposed to the core and the mold. Subsequently, the parison is transferred to a delay station whereby heat within the parison is permitted to flow to these surfaces, thus reducing the temperature of the interior of the parison and reheating the exposed walls so as to obtain a parison having a more uniform cross-sectional temperature within a range necessary to achieve biaxial orientation. When the desired temperature is obtained, the parison is expanded into the desired configuration.

The instant invention proposes structure for performing this process in a most economical and efficient manner.

SUMMARY OF THE INVENTION

Such structure includes injection and expansion molds preferably disposed opposite one another, with a shaft disposed between them and carrying two sets of cores which are capable of both reciprocable and rotatable movement. Such an arrangement permits alternative movement of each set of cores between the molds and a delay station necessary to achieve the more uniform parison temperature.

Accordingly, it is a primary object of my invention to provide an apparatus with which a biaxially oriented plastic article can be manufactured at a high rate of production. Too, such apparatus is especially adapted for uniformly reducing the temperature of a parison from its injection temperature to its glass transition temperature so as to achieve a highly oriented plastic article such as a container for carbonated beverages.

Additionally, it is an object of my invention to provide a molding apparatus including injection molds and expansion molds each being separately closed by its own hydraulic or mechanical systems in such manner as to avoid the application of unequal closing forces on the molds. It is also an object of this invention to provide carrier means for the blow sticks which permit efficient transfer thereof between the injection and expansion molds without employing a 360° rotatable turntable so as to avoid the usual problems of indexing the blow sticks and inherent problems of alignment thereof with the molds.

DESCRIPTION OF THE DRAWINGS

The manner in which the objects of the invention are attained will be made clear by a consideration of the specification and claims when taken in conjunction with the drawings in which:

DETAILED DESCRIPTION

As indicated in my copending application, a preferred process for obtaining an oriented plastic container at an economical production rate includes the injection of a plasticized material into a mold about a core, uniform cooling to within a few degrees of the material's glass transition temperature ($T_G$), and expansion to form the finished article. In view of the relatively low thermal conductivity of the plastic, the cooling process involves two steps. First, the exposed surfaces are cooled to or below $T_G$ through heat transfer to the core and the mold and then the parison is removed from the mold to a delay position such that the heat within the interior of the parison will flow to the exterior walls cooling the interior to $T_G$ and reheating the exposed surfaces so as to obtain a more uniform cross-section temperature. Accordingly, the instant invention includes a structural arrangement which facilitates the formation of a parison on a core, cooling, a transfer to a delay position with subsequent placement of the parison into a blow mold for expansion.

Figure 2:
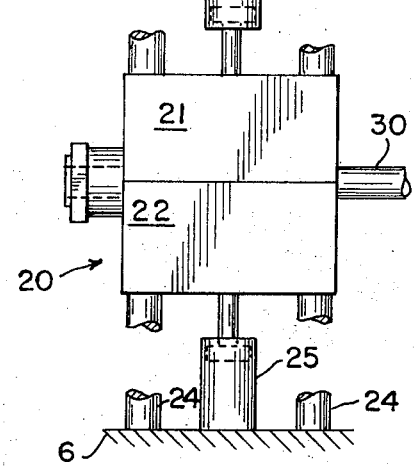
FIG. 2 is a side elevation view of the blow mold apparatus.

As illustrated in my preferred embodiment, the apparatus for efficiently practicing the process may include an injection mold 10 and an expansion mold 20. As shown in FIG. 2, the expansion mold 20 may comprise an upper mold half 21 and a lower mold half 22 supported for vertical movement by guide rods 24. Hydraulic cylinders 25 and 26, interposed between supports 5 and 6, are then utilized for opening and closing the molds.

Figure 1:
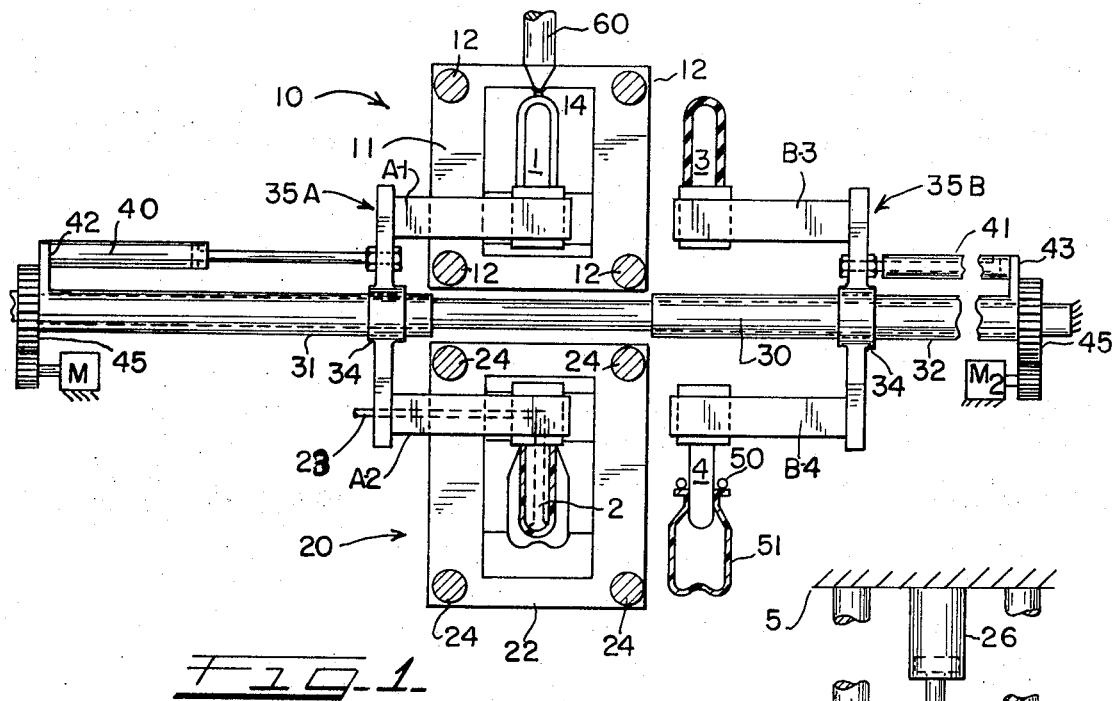
FIG. 1 is a plan view taken through the horizontal center line of the instant invention.

Preferably disposed opposite of this expansion mold is an injection mold 10 (FIG. 1) which also comprises upper and lower mold halves (the lower mold half 11 only being depicted) which are supported for vertical movement by tie bars 12 upon actuation of hydraulic cylinders (not shown) similar to those utilized for the expansion mold 20. An injection nozzle 60 of a thermoplastic extruder is stationed adjacent the injection mold as depicted in FIG. 1 and is programmed to deliver a plasticized material into the mold through an aperture 14 upon closing of the mold.

Such material, upon injection into mold 10, forms a parison about an appropriate core 1, 2, 3 and 4 which are held by two core carriers 35A and 35B supported for both rotational and rectilinear motion by countershafts 31 and 32 upon a fixed shaft 30. The carriers 35A and 35B comprise two linear members extending radially away from a hub 34 at 180° apart, and support at each end thereof arms A—1, A—2, and B—3 and B—4 to which are affixed cores or blow sticks 1, 2, 3 and 4. Preferably, the hubs 34 are constrained for rotation with the countershafts, but may reciprocate along their external surfaces as hereinafter described.

Figure 4:
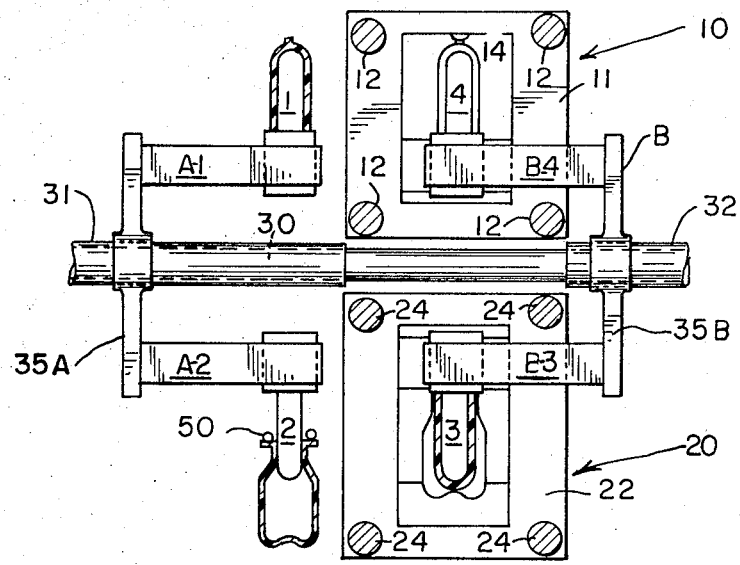
FIG. 4 depicts the apparatus in the second stage of its operation with the blow sticks having been reciprocated.
Figure 5:
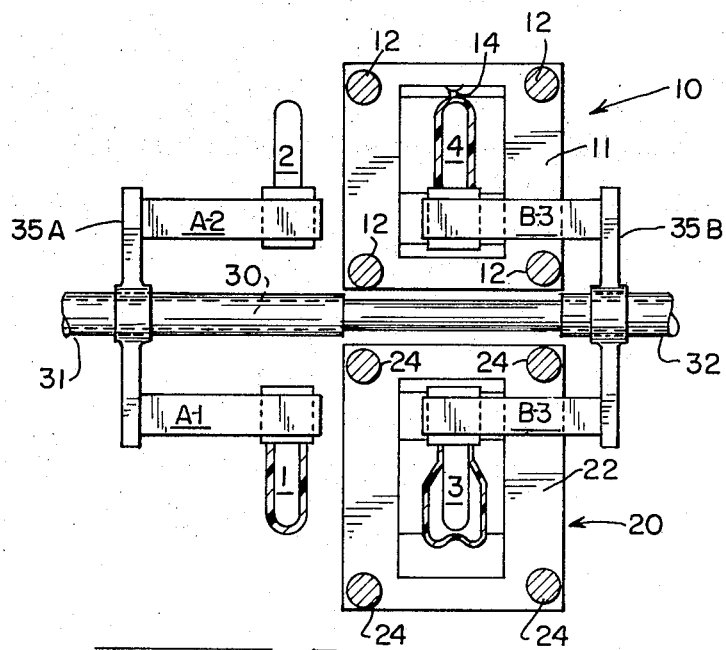
FIG. 5 depicts the apparatus at the completion of stage two.

Double acting cylinders 40 and 41 are interposed between support arms 42 and 43 of each countershaft 31 and 32 and the core carriers 35A and 35B for obtaining reciprocal motion of the carriers so as to place the appropriate cores (1 and 2 or 3 and 4) in juxtaposition with the molds upon opening and closing thereof. As depicted in FIG. 1, the hydraulic motor 40 has placed the cores 1 and 2 of carrier 35A in juxtaposition with the mold halves of the injection mold 10 and the blow mold 20. Upon opening of the mold halves by the hydraulic cylinders (25 and 26 for the blow mold), the motor 40 will reciprocate the carrier 35A to the left for cooling the parison (FIG. 4) while the carrier 35B and its cores 3 and 4 are moved into juxtaposition with these two molds by the motor 41.

In addition to reciprocating the core sets 1 and 2 or 3 and 4 into and out of juxtaposition with the molds, means are provided for rotating the individual core sets between the injection mold 10 and the expansion mold 20. Such means may take the form of two motors M—1 and M—2 Of the reversible, one-half revolution type whose pinion drives a gear 45 constrained for rotation with its associated countershaft 31 or 32. Such motors and associated structure obviously will avoid the normal 360° rotation of the cores, and thus alleviate substantial indexing problems of the carriers, and facilitate the connection of hydraulic and pneumatic conduits to the cores and motors minimum sealing problems. Although not disclosed, simple indexing means in the form of abutments for all of the hydraulic and electrical motors M—1 and M—2 may be sufficient.

MODE OF OPERATION

FIGS. 1, 3, 4 and 5 illustrate the steps through which this novel apparatus accomplishes the formation of a biaxially oriented hollow article. In FIG. 1, the cylinders 40 and 41 have reciprocated the core carriers 35A and 35B to the right so as to place the cores 1 and 2 of carrier A into the juxtaposition with the injection and the blow molds 10 and 20 which were subsequently closed by hydraulic cylinders such as 25 and 26 for the blow mold. In this stage of operation, the extruder will inject a thermoplastic material into mold 10 so as to form a parison upon core 1 while a fluid is directed through a conduit 23 in arm A—2 and the core 2 so as to expand the parison formed upon this core against the interior walls of the blow mold 20. Subsequently, the surfaces of the parison adjacent the core and the injection mold are cooled to or below the glass transition temperature of the material by fluid passing therethrough as suggested in application, Ser. No. 201,823. Thus, core 1 may remain in the injection mold 10 for the normal time of injection (approximately 3 seconds) and for an additional cooling period (4 or more seconds). During this stage, ejector means 50 will first strip a previously formed hollow article 51 from the core 4, and motor M—2 will rotate the countershaft 32 and its carrier 35B through 180°. Thus, ejection of a hollow article 51 and rotation of the carrier 35B occurs simultaneously with the injection and blowing of parisons on cores 1 and 2 of carrier 35A. Additionally, it should be noted that the parison previously formed upon core 3 is exposed to the atmosphere during the injection of the parison upon core 1, and this delay prior to the expansion will permit heat to transfer from the interior of the parison to the surfaces adjacent the core and that exposed to the atmosphere. Such delay in conjunction with the prior cooling will permit a more uniform cross-section temperature near $T_G$ to be obtained so as to achieve maximum orientation.

Figure 3:
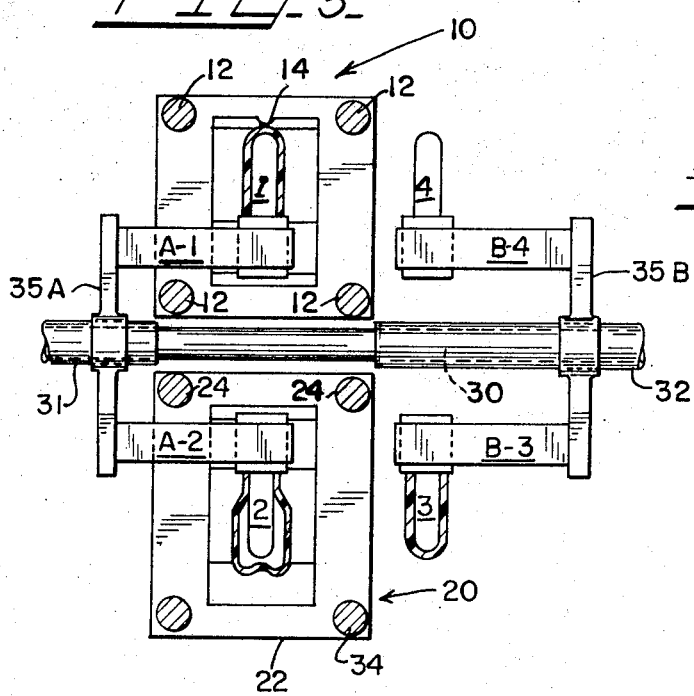
FIG. 3 is similar to FIG. 1 and depicts the position of the apparatus in its first stage or operation.

FIG. 3 depicts the completion of this stage of operation.

The next stage of operation is the opening of molds 10 and 20 and subsequent reciprocation of carriers 35A and 35B and the cores to the left by the motors 40 and 41 so as to place cores 3 and 4 in juxtaposition with the molds. Due to the prior rotation of carrier 35B during phase one, core 4 is now placed adjacent the injection mold and the molds will be closed by the appropriate hydraulic motors (see FIG. 2). Injection and cooling of a parison about core 4 will take place while the parison previously formed on core 3 is blown in the blow mold 20. During this process of injection and blowing on the cores 3 and 4, the hollow article will be ejected form core 2 of carrier 35A which will then be rotated 180° through actuation of the motor M—1. Subsequently, the molds will open and the carriers will be shifted for continued operation such that injection and expansion occurs with respect to the cores of one carrier while the cooling, article ejection and rotation of the other cores takes place.

It should now be appreciated that through the utilization of two carriers (each having at least two cores thereon) a parison formed upon one of the cores will be subjected to a delay and heat redistribution cycle during the injection of a parison onto a core of another carrier. It is this additional delay step which permits the formation of a hollow article 51 with additional strength characteristics. Such cooling as described in this application and the subsequent expansion results in biaxial orientation of the article. Additionally, by providing the two carriers, the overall rate of producing the articles is not reduced.

The apparatus herein disclosed, including the utilization of separate hydraulic cylinders and four tie or guide bars for both the injection mold and the blow mold, permits the application of the desired mold closing forces without incurring the problem of unequal distribution of stress on the two molds. Too, minimum frame structure is utilized for supporting the molds. Additionally, it should be quite clear that by providing two separate carriers for the cores, only 180° of rotation of the carriers are necessary to transfer the cores from the injection mold to the blow mold. Such minimum rotation alleviates prior problems with respect to accurate indexing of a 360° turntable and at the same time permits or facilitates less expensive means of connecting the air or fluid pressure conduits to the cores for blowing of the hollow articles. Alternatively, the utilization of a 360° turntable will result in substantial sealing problems.

As previously indicated in the specification, there are numerous modifications which may be made to my preferred embodiment. For example, it should be quite clear that the lower mold halves may be fixed with the support shaft 50 being adapted for vertical movement so as to raise the cores out of them.

In conjunction with these preferred embodiments, I claim:

1. An apparatus for making hollow articles comprising:
   a. injection and blow mold units carried by a frame means and including means for opening and closing same;

b. carrier means having an axis and multiple separate sets of cores spaced along said axis, said cores being receivable by the molds;

c. means for reciprocating said multiple sets of cores along said axis so as to place one set in juxtaposition with said mold units at a time; and d. means for rotating the sets of cores about said axis between the injection and blow mold units.

2. An apparatus as recited in claim 1 in which:

a. said carrier means are supported for reciprocable and rotational motion and a countershaft carried by a fixed elongated shaft extending along said axis.

3. An apparatus as recited in claim 1 together with:

a. motor means carried by the support for effecting individual rotation of the sets of cores.

4. An apparatus as recited in claim 1 in which:

a. said sets rotate less than 361° in transferring said cores between the molds.

5. An apparatus for making hollow articles comprising:

a. injection and expansion mold units supported about a carrier means;

b. means carried by a support for opening and closing said mold units;

c. carrier means mounted on a support between said mold units;

d. at least two separate sets of cores mounted on said carrier means;

e. means for reciprocating said carrier means along an axis extending between said mold units to alternatively place the cores of one set in juxtaposition with said injection and expansion molds and the cores of another set at a delay position; and f. means for rotating said carrier means about said axis to alternate the cores between the injection and expansion molds.

6. An apparatus for forming hollow plastic articles comprising means defining a fixed axis, injection and expansion molds disposed along a line which extends transversely of said axis in any axially fixed position, carrier means mounted for reciprocatory movement along and rotary movement about said axis, two cores supported by said carrier means and disposed along a line which extends transversely of said axis and in accordance with the relative positions of said molds for registration in said molds, means for reciprocating said carrier means along said axis between a position wherein said cores are in register with said molds and a position axially offset from and clear of said molds, and means for rotating said carrier means about said axis for alternating said cores between each of said molds.

7. Apparatus as recited in claim 6 wherein said molds are split molds and are movable transversely of said axis.

8. Apparatus as recited in claim 6 wherein said axis is defined by a fixed shaft, and said carrier means are mounted on said shaft for the reciprocating and rotating movement thereof.

9. Apparatus as recited in claim 6 wherein said axis is defined by a fixed shaft, and said carrier means are mounted on said shaft for the reciprocating and rotating movement thereof, said shaft extending between said molds, said carrier means including a carrier mounted on said shaft on each side of said molds, and each carrier carrying a set of said cores for alternating cooperation with said molds.

10. The apparatus of claim 9 wherein said means for rotating said carrier means includes separate means for rotating each of said carriers independently of one another.

* * * * *